H. VAN HOEVENBERG.
PHOTOGRAPHIC APPARATUS.
APPLICATION FILED APR. 13, 1915.
1,254,013.
Patented Jan. 15, 1918.
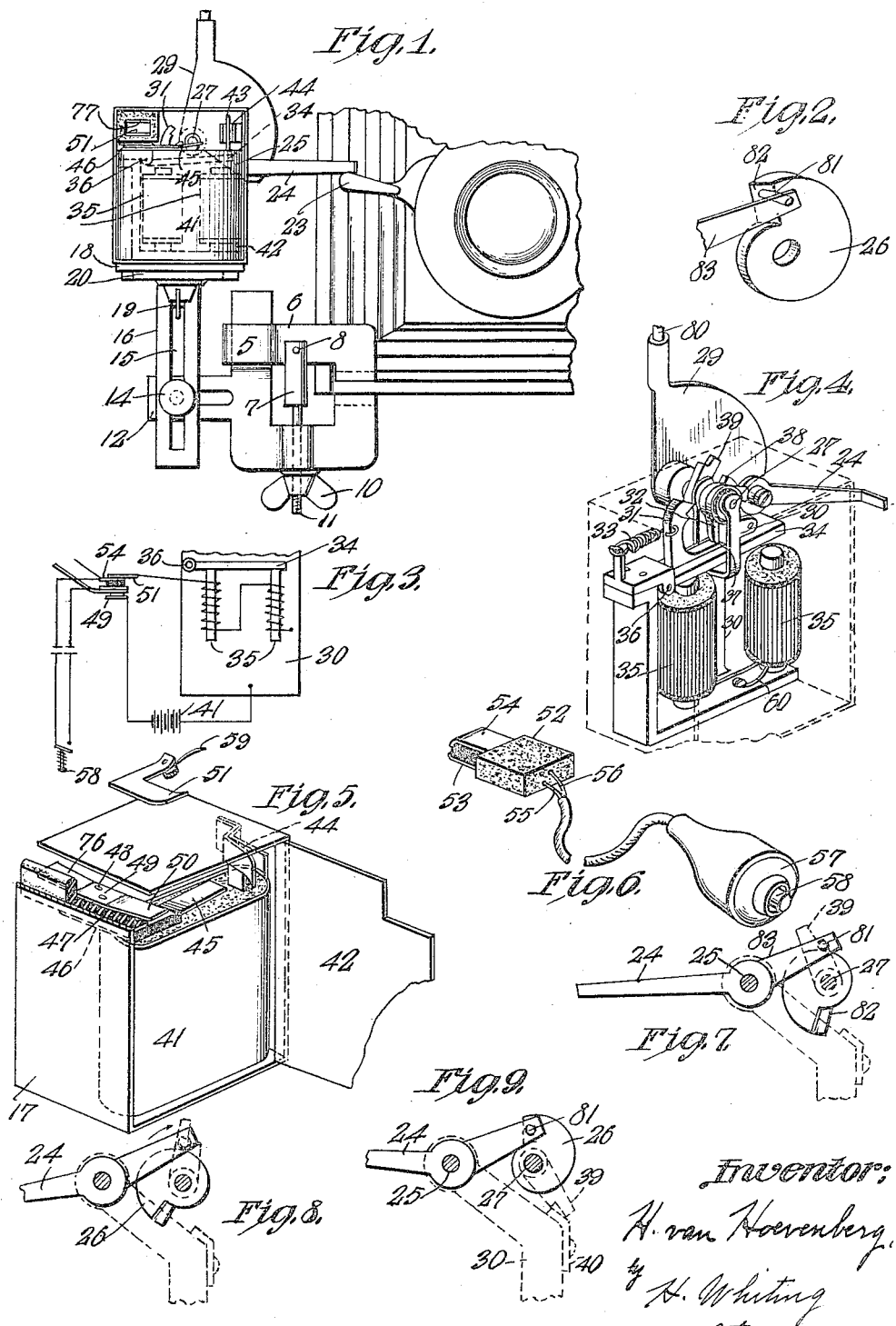
Inventor:
H. van Hoevenberg.
by H. Whiting
Attorney

UNITED STATES PATENT OFFICE.

HENRY van HOEVENBERG, OF LAKE PLACID CLUB, NEW YORK.

PHOTOGRAPHIC APPARATUS.

1,254,013. Specification of Letters Patent. Patented Jan. 15, 1918.

Application filed April 13, 1915. Serial No. 20,989.

*To all whom it may concern:*

Be it known that I, HENRY VAN HOEVENBERG, a citizen of the United States, and a resident of Lake Placid Club, in the county of Essex and State of New York, have invented certain new and useful Improvements in Photographic Apparatus, of which the following is a specification.

This invention relates to improvements in photographic apparatus and more particularly to the operating of the camera from a distance.

It sometimes happens that it is desired to operate the shutter of a camera from a point somewhat removed from the camera, as for example when the person operating the shutter desires to be in the picture himself. Again, the camera may be placed in an inconvenient position to get a photograph at an odd angle, in which position the camera may be beyond the reach of the ordinary person.

It is hence an object of this invention to provide means whereby a camera can be quickly and easily operated from a point distant therefrom.

The device is made small and compact in structure so that it can be attached readily to any camera without adding unduly to the weight or bulkiness of the mechanism as a whole.

Generally speaking, the mechanism while controlled by means of an electric current is operated mechanically, so that a very small battery can be used, thereby adding to the lightness of the device and also avoiding an expensive apparatus. The mechanism is so arranged that it will first open the shutter, leave it open as long as the button is pushed, then close the shutter when the circuit is opened.

Other features and advantages will be described more fully hereinafter and particularly set forth in the claims.

Reference may be had to the accompanying drawing in which like reference characters denote corresponding parts, and in which—

Figure 1 is a detail view on front elevation, showing the device attached to the camera and in its set position ready for operation.

Fig. 2 is a detail view showing the action of the cam in operating the shutter arm.

Fig. 3 is an electrical diagram showing the connections of the various wires to the shutter operating mechanism.

Fig. 4 is a skeleton perspective view showing details of the mechanism.

Fig. 5 is a separated view of the contacts and battery showing the electrical connections.

Fig. 6 is a contracted view of the push button control which extends from the mechanism of the camera to the operator.

Fig. 7 is a detail showing the relation of the cam to the actuator when the mechanism is in its primed condition ready to be tripped into action.

Fig. 8 is a view similar to Fig. 7, except that the mechanism has been tripped and caught in its intermediate mid position when the shutter is opened.

Fig. 9 is a view showing the parts in Figs. 7 and 8 after the motion has been completed and the shutter closed by its actuator.

Referring more particularly to the separate parts of this invention as embodied in the form shown in the drawings, 1 indicates a camera which may be of any suitable form and is indicated as being of the extensible type with a cover 2 which when opened forms a sort of base board. The apparatus may be attached to the camera 1 in any suitable manner as by gripping it onto the base board 2.

For this purpose, as shown in Fig. 1, there is provided a clamp 3 having a jaw 4, on which is slidingly mounted as at 5 a second jaw 6. These jaws are adapted to be drawn together by a turn buckle 7, so that they may grip the cover 2 between them. The turn buckle 7 is shown as being pivoted as at 8 to one of the jaws 6 and extending through an opening 9 in the other of the jaws, the adjustment being obtained by means of a thumb nut 10 screwed onto the threaded end 11 of the turn buckle.

To provide for various adjustments, the clamp 3, embodying the jaws 4 and 6, is provided with an extension 12, having a slot 13 in which extends a binding screw or nut 14. This screw or nut also extends through a slot 15 in a bracket 16. It will thus be seen that the bracket 16 can be adjusted to the right or left (Fig. 4) relative to the clamp 3 and up or down relative to this clamp. The bracket 16 forms a support for the casing 17 of the main apparatus.

In order that this casing itself may also be adjustably mounted, it is provided with a bottom plate 18 which may be adjustably secured thereto in any suitable manner and which has a nut or screw 19 extending through a slot 20 in a horizontal flange 21 of the bracket 16. It will thus be seen that the casing 17 which contains the main portion of the apparatus can be adjusted in a variety of ways relative to the camera 1, so as to get the proper relation with respect thereto.

The main purpose, as stated above, is to operate the camera. This resolves itself into operating the shutter 22 of the camera, which shutter is provided with a shutter arm 23. To operate the shutter arm 23, the apparatus is provided with an actuator 24 in the form of a lever operated intermediate its ends as at 25. Normally, the actuator 24 lies over the shutter arm 23 as in Fig. 1. To rock the actuator 24 about its pivot and thus operate the shutter arm 23, there is provided a snail cam 26 mounted on a shaft 27. The shaft 27 is to be driven so as to rock the actuator 24 by means of a coil spring 28, which is normally under a certain amount of tension, and when the device is set for operation, it is further tensioned to make its action effective.

To place this added tension on the coil spring 28 which acts in the nature of a spring motor, the shaft 27 extends through the casing 17 to the outside thereof where it is provided with a controller shown in the form of a quadrant 29. It will be seen that this quadrant 29 can be readily swung through an arc to rotate the shaft 27, and thus tension the spring 28, one end of which being secured to the shaft and the other end to a fixed support such as a bracket 30 forming a part of the mounting for the shaft 27.

In order to catch the shaft 27 in its set position with the spring 28 under the added tension, there is provided a latch 31 which engages a dog or arm 32 secured to the shaft 27. The latch 31 is normally held in a raised position to engage the dog 32 by means of a spring 33, so that it will catch the dog and thus hold the shaft 27 after the spring 28 has been tensioned.

With the dog 32 caught by the latch 31, we find the mechanism all set ready to operate the actuator 24 which in turn will operate the shutter arm 23. In order to permit such action, it is necessary to trip the latch 31. For this purpose, the latch 31 is mounted on a bar 34 which is in reality the armature for a two pole electro-magnet 35.

Now then, if a current is sent through the electro-magnet 35, the armature 34 would be attracted thereto and move about its pivot 36 against the tension of the spring 33 to withdraw the latch 31 from engagement with the dog 32. The spring 28 will then uncoil and rotate the shaft 27. The return movement of the shaft 27, however, is incomplete as it is desired on this initial action to merely open the shutter 22 by operating the shutter arm 23 incompletely.

It may be desired to hold the shutter open for a period of time, so that it is necessary to catch the shaft 27 and the cam 26 carried thereby in this position. For this purpose, the bar or armature 34 is provided with a pawl 37 which, when the armature 34 is drawn to its magnets 35, comes into the path of a dog 38 carried by the shaft 27. As soon, however, as the current ceases to flow through the magnet 35, then the armature 34 will be withdrawn by means of the spring 33, thus removing the pawl 37 from engagement with the dog 38, so that the spring 28 is free to rotate the shaft the remainder of its movement, thereby completing the operation of the actuator 24, and thus closing the shutter 22 through the medium of the shutter arm 23.

In order to energize the magnet 35, there is provided in the casing 17, a battery 41 which is preferably easily detachable, so that it can be removed or have another battery substituted therefor. To arrange this in a convenient manner, the casing 17 is provided with a door 42 hinged thereto and opening readily to permit access to the interior of the casing. The battery 41 is provided with a knife terminal 43 which, when the battery is in position, wedges in between a mating plug 44 grounded on the casing 17 which is preferably made of a conducting metal.

The other terminal 45 of the battery extends horizontally as distinguished from the vertical extension of the terminal 43 and is bent so as to be somewhat springy to engage firmly with the contact 46 mounted on an insulating plug 47. The contact 46 is connected through the insulating plug 47 by conductors 48 to a double spring contact 49 having a spring end 50. Spaced apart from the spring contact end 50, there is provided another contact 51, so as to form therewith a socket into which a plug 52 may be inserted preferably through an opening in the casing 17 shown to be provided in the corner of the door 42.

The plug 52 is provided with two contacts 53 and 54 engaging respectively with the contacts 50 and 51 when the plug 52 is in position. Contacts 53 and 54 are connected respectively to wires 55 and 56 which are connected to the ends of a switch 57 shown in the form of a push button switch operated by a push button 58. The wires 55 and 56 may be twisted so as to form a single strand and may be of any suitable length according to the distance from the camera at which the operator desires to control the camera.

It will be seen that when the push button 58 is pressed, the switch 57 will be closed, thereby completing the electric circuit between the contacts 50 and 51, the contact 50 being connected to the battery 41 and the contact 51 being connected by a conductor 59 to the windings of the magnets 35, the other end of the windings being grounded at 60 to the support for the magnets which is mounted in the casing 17, and thus connected to the opposite end of the battery 42, which is also grounded on the casing 17.

It will thus be seen that a slight pressure on the push button 58 will complete the circuit through the battery 42 and the magnets 35 energizing the latter and drawing the armature 34 down onto the poles of the magnet to start the primed actuating mechanism into operation.

When the pressure on the push button is relieved so that the circuit opens, the magnets 35 will become dormant, permitting the spring 33 to draw the armature 34 away from the magnets, thereby withdrawing the pawl 37 from the dog 38, permitting a further advancing movement of the shaft 27 and the cam 26 carried thereby and the propulsion of the spring 28. The cam 26 then will operate the actuator 24 still further so as to close the shutter 32 through the operation of the shutter arm 23.

The quadrant 29 may be provided with a flag 80 which will show when the same is erect that the mechanism is in its set or primed condition, ready to be tripped into operation, and when in horizontal position, that the shutter is open, and when in depressed position, that the mechanism has been completely operated and the shutter is closed.

It is believed that taken with the above description, the operation will be evident. Briefly stated, the camera is placed in any suitable position and directed toward the point where the object or people to be photographed are to be positioned. The operator then himself may stand in range of the camera or any other suitable point, no matter how far from the camera it may be, and operate the same.

To enable the operation, the camera is first primed by turning the quadrant 29 until the dog 32 is caught by the latch 31, in which position the quadrant, bearing the flag 80, will be erect. When everything is ready, the operator pushes the button 58, thus completing the circuit to the electromagnet 35, tripping the latch 31 from the dog 32, allowing the shaft 27 to rotate under the propulsion of the spring 28, until the pawl 37 engages the dog 38 and stops further advancing movement. This action causes the snail cam 26 to rock the actuator 24, and thus spring the shutter arm 23 to open the shutter 22.

When the pressure on the push button is relieved, the escapement mechanism permits the shaft 27 to rotate still further, closing the shutter 32 and completing the operation. The push button 58 may be put in a position to be operated automatically by a person coming into a room or the like, so that the camera may be set off without volition. In this manner the apparatus can be used as an adjunct to a dictagraph in obtaining evidence.

It will be noted that when the mechanism has been completely operated and the parts removed to their unprimed condition, the actuator will occupy somewhat the relation to the cam 26 as is shown in Fig. 2. To reprime the mechanism for another operation without rocking the actuator 24, one arm thereof, indicated at 83, is formed of spring metal and the pin 81 thereon, which normally engages the periphery of the cam 26, is beveled so as to cam downwardly when in engagement with the bevel surface 82 of the cam 26, whereby the cam 26 can be rotated backward, the pin 81 passing over the side face of the cam 26 and not rocking about its pivot. When the cam 26 reaches the position of Fig. 8, showing that the mechanism is primed, the spring arm 83 will snap the pin 81 to a position superposed above the spiral periphery of the cam 26 ready for a subsequent actuation.

While I have shown one embodiment of my invention, I do not wish to be limited to the specific details thereof, but desire to be protected in various changes, alterations and modifications which may come within the scope of the appended claims.

Having thus described my invention, I claim as new and desire to secure by Letters Patent:

1. In a camera attachment adapted to cooperate with the camera by operating the shutter of the same, the combination with a shutter actuator, of driving means for said shutter actuator, a dog connected to said driving means, a latch engaging said dog to prevent an operation of said driving means, an electro-magnet for releasing said latch, and dog and pawl mechanism for interrupting the movement of said driving means after the release of said dog from said latch.

2. In a camera attachment adapted to cooperate with the camera by operating the shutter of the same, the combination with a shutter actuator, of a cam for driving said shutter actuator, a shaft for driving said cam, a spring for driving said shaft, a dog on said shaft, a latch engaging said dog, and means for releasing said latch.

3. In a camera attachment adapted to cooperate with the camera by operating the shutter of the same, the combination with a shutter actuator, of a cam for driving said shutter actuator, a shaft for driving said cam, a spring for driving said shaft, a dog on said shaft, a latch engaging said dog, an electro-magnet for releasing said latch, and a circuit closable from a point distant from said latch and said shutter actuator for energizing said electro-magnet.

4. In a camera attachment adapted to coöperate with the camera by operating the shutter of the same, the combination with a shutter actuator, of a cam for driving said shutter actuator, a shaft for driving said cam, a spring for driving said shaft, a dog on said shaft, a latch engaging said dog, a second dog on said shaft, a pawl engaging said second dog, and operating means for releasing said latch from said first dog and engaging said pawl with said second dog and then releasing said second dog from said pawl so as to give a step by step movement of said shaft and thus an intermittent operation of said actuator.

Signed at New York city, in the county of New York and State of New York, this 8th day of April, 1915.

HENRY van HOEVENBERG.

Witnesses:
GRACE VALENTINE,
H. WHITING.

Copies of this patent may be obtained for five cents each, by addressing the "Commissioner of Patents, Washington, D. C."